(12) United States Patent
Cauchy et al.

(10) Patent No.: US 8,264,496 B2
(45) Date of Patent: Sep. 11, 2012

(54) DATA MANAGEMENT FOR IMAGE PROCESSING

(75) Inventors: Xavier Cauchy, Laval (FR); Bruno Thery, Grenoble (FR); Anthony Philippe, Grenoble (FR); Mark Petrus Vos, Crolles (FR)

(73) Assignee: STMicroelectronics S.A., Montrouge (FR)

( * ) Notice: Subject to any disclaimer, the term of this patent is extended or adjusted under 35 U.S.C. 154(b) by 958 days.

(21) Appl. No.: 12/047,336

(22) Filed: Mar. 13, 2008

(65) Prior Publication Data

US 2008/0229034 A1    Sep. 18, 2008

(30) Foreign Application Priority Data

Mar. 14, 2007    (FR) ...................................... 07 01839

(51) Int. Cl.
*G06F 12/00* (2006.01)
*G06F 12/02* (2006.01)
*G06F 12/06* (2006.01)

(52) U.S. Cl. .......................... 345/564; 345/565; 345/571

(58) Field of Classification Search .................. 345/530, 345/564–574

See application file for complete search history.

(56) References Cited

U.S. PATENT DOCUMENTS

| 5,455,908 A | * | 10/1995 | Ishida ........................... 345/572 |
| 5,900,865 A | | 5/1999 | Howe |
| 6,938,118 B1 | | 8/2005 | Blixt et al. |

FOREIGN PATENT DOCUMENTS

WO    WO 99/63751    12/1999

OTHER PUBLICATIONS

International Preliminary Search Report dated Nov. 19, 2007 for French Application No. 0701839.

* cited by examiner

*Primary Examiner* — Xiao M. Wu
*Assistant Examiner* — Andrew Shin
(74) *Attorney, Agent, or Firm* — Lisa K. Jorgenson; Stephen Bongini; Fleit Gibbons Gutman Bongini & Bianco P.L.

(57) ABSTRACT

An image processing system includes a memory for storing data associated with pixels of images, with the pixels having spatial coordinates in an image coordinate system having first and second axes; a processing device including a processor which processes the associated data; and an interface device which accesses in memory addresses associated with pixels of a block of pixels. In the interface device, access information is received indicating a base memory address, information regarding the dimensions of the block along the axes of the image coordinate system, and a storage method. At least one access rule is selected from multiple rules as a function of the storage method. The memory is accessed at the addresses associated with the pixels in the block, by applying the selected rule starting from the base address and taking into account the dimensions of the block.

20 Claims, 5 Drawing Sheets

DATA MANAGEMENT FOR IMAGE PROCESSING

CROSS-REFERENCE TO RELATED APPLICATIONS

This application is based upon and claims priority from French Patent Application No. 07 01839, filed Mar. 14, 2007, the entire disclosure of which is herein incorporated by reference.

FIELD OF THE INVENTION

The present invention relates to the processing of images, and more particularly to the management of image data stored in memory that is external to an image processing device.

BACKGROUND OF THE INVENTION

In certain applications, for example in the domain of video, a mass storage device, or external memory, stores data for processing by a processor of a data processing device according to a given algorithm. The data can be stored in this memory in a format which differs from the data format supported by the processor.

In particular, the data stored in external memory can correspond to information on chrominance and luminance. Video images are conventionally encoded using such information. To convert a video signal into chrominance data and luminance data, the signal is sampled. Then chrominance and/or luminance data are associated with all or part of the samples depending on the encoding used for the image.

Different encoding formats are conventionally used. For example, the terms "4:2:2" and "4:2:0" designate different encoding formats which are conventionally used, with each describing a different structure for a digital image. The term 4:2:2 indicates that the chrominance is horizontally subsampled by a factor of two relative to the luminance. The term 4:2:0 signifies that the chrominance is horizontally and vertically subsampled by a factor of two relative to the luminance. The stored data vary not only as a function of the encoding of the video image, which provides more or less luminance data and chrominance data for a video image, but also as a function of the storage method (also called the storage format) used for the encoded data. Chrominance and luminance data can successively alternate in memory in the order of the pixels of an image, or can be stored separately (with the chrominance data in one place and the luminance data in another).

To retrieve data from external memory, it is conventional to use a DMA (Direct Memory Access) device. A DMA device enables direct data transfers between an external memory and an internal memory that is associated with the processor without requiring the intervention of the microprocessor, with some exceptions, such as when initiating and concluding a data transfer.

Generally, the processor processes video data representing the respective locations of the pixels which form the video images.

The data is stored at respective addresses in the external memory. Then, for the requirements of the processing applied by the processor to the data, the data is requested via the DMA device as a function of the location of the pixels with which it is associated, generally meaning as a function of the spatial coordinates of the different pixels in the images.

For some of the processing applied by the processor, the processor may request the retrieval of certain data from external memory via the DMA device without knowing the format of the data stored in the external memory. Therefore the processor may not be able to indicate to the DMA device the memory address or addresses corresponding to the data being requested.

In such conditions, the DMA device is responsible for translating the information received in a data request from the processing device into an address based on the storage format in external memory. To perform such a translation and retrieve the requested data from the external memory, a fixed rule of correspondence is generally determined in the DMA device, establishing a correspondence between the information received in the request and an address in the external memory.

More specifically, in a conventional architecture using a DMA device, the DMA device is in charge of determining a block of data to be retrieved from external memory, and cooperates with an interface module connected to it. This module is more specifically in charge of determining the different addresses of the data contained in the block of data to be retrieved. Architecturally, determining the addresses of the data to be retrieved therefore corresponds to a first step having a first level of granularity which allows determining a block of data to be retrieved, with this first step being implemented by the DMA device, and a second step having a second level of granularity which allows determining the addresses of the data contained in the block of data, with this second step being implemented in the interface module.

An interface module operates on the basis of a rule of correspondence, which is fixed because it is directly linked to a given storage method. When a DMA device is responsible for retrieving blocks of data corresponding to different storage formats, several modules are coupled to that DMA device, with each corresponding to one of the different storage formats.

It is therefore difficult to adapt a DMA device to different storage formats in external memory.

SUMMARY OF THE INVENTION

The present invention aims to overcome this disadvantage and to provide a DMA device having increased flexibility.

The present invention also aims to provide a DMA device which is able to more easily adapt to different storage formats in external memory.

A first embodiment of the present invention provides a data management process for an image processing system that includes a memory, a processing device, and an interface unit. The memory is adapted to store, at given addresses, data associated with pixels of images, with the pixels having spatial coordinates in an image coordinate system having a first axis and a second axis. The processing device comprises a processor adapted to process the data associated with pixels of the images, and the interface device is adapted to access the memory at addresses associated with pixels of a block of pixels in the image coordinate system. According to the data management process, in the interface device. There is received access information concerning a given block of pixels. The access information indicates a base address in the memory, information regarding the dimensions of the block of pixels along the first and second axes of the image coordinate system, and a storage method. As a function of the storage method indicated, there is selected at least one access rule from multiple distinct access rules, with each of the access rules corresponding to a path through successive pixels along the first and second axes of the image coordinate system according to one storage method from among multiple storage methods. The memory is accessed at the addresses associated with the pixels in the block of pixels, by applying the selected access rule starting at the indicated base address and by taking into account the dimensions of the block of pixels.

A second embodiment of the present invention provides an interface device for an image processing system that additionally includes a memory and a processing device. The memory is adapted to store, at given addresses, data associated with pixels of images, with the pixels having spatial coordinates in an image coordinate system having a first axis and a second axis. The processing device comprises a processor adapted to process the data associated with pixels of images. The interface device includes a receiving unit, a selection unit, and a memory access management unit. The receiving unit is adapted to receive access information for a given block of pixels. The access information indicates a base address in the memory, information regarding the dimensions of the block of pixels along the first and second axes of the image coordinate system, and a storage method. The selection unit is adapted to select, as a function of the indicated storage method, at least one access rule from among multiple distinct access rules, with each of the access rules corresponding to a path through successive pixels along the first and second axes of the image coordinate system according to one storage method from among multiple storage methods. The memory access management unit is adapted to access the memory at the addresses associated with the pixels in the block of pixels, by applying the selected access rule starting from the base address and by taking into account the dimensions of the block of pixels.

A third embodiment of the present invention provides a data processing system comprising such a processing device.

A fourth embodiment of the present invention provides a computer program for an interface device, comprising instructions able to implement such a data management process when the program is executed by the processing means of the interface device.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF THE PREFERRED EMBODIMENTS

Preferred embodiments of the present invention will be described in detail hereinbelow with reference to the attached drawings.

The term "image coordinate system" as used below means the coordinate system for an image, defined by a horizontal axis for the abscissas, oriented from left to right, and a vertical axis for the ordinates, oriented from top to bottom.

A first embodiment of the present invention provides a data management process for an image processing system. The image processing system includes a memory, a processing device, and an interface device. The memory is adapted to store, at given addresses, data associated with pixels of images, with the pixels having spatial coordinates in an image coordinate system having a first axis and a second axis. The processing device comprises a processor adapted to process the data associated with pixels of the images, and the interface device is adapted to access the memory at addresses associated with pixels of a block of pixels in the image coordinate system. According to the data management process, in the interface device access information for a given block of pixels is received. The access information indicates a base address in the memory, information regarding the dimensions of the block of pixels along the first and second axes of the image coordinate system, and a storage method. As a function of the storage method indicated, at least one access rule is selected from multiple distinct access rules, with each of the access rules corresponding to a path through successive pixels along the first and second axes of the image coordinate system according to one storage method from among multiple storage methods. The memory is accessed at the addresses associated with the pixels in the block of pixels, by applying the selected access rule starting at the indicated base address and by taking into account the dimensions of the block of pixels.

With this process, the interface device has access to multiple access rules that are adapted to different storage methods for data representing the pixels of an image stored in the memory. In general, an access rule defines a series of addresses in the memory which corresponds to a path through successive pixels along an axis of the image coordinate system. These different access rules allow the managing of address-to-address displacement in the memory, which corresponds to a pixel-to-pixel displacement in the image coordinate system along the different axes of the image coordinate system.

As an example, the process according to one embodiment of the present invention is presented below for a two-dimensional image. However, it is easy to apply such a process to an image having more than two dimensions. To do so, it is sufficient to consider an image coordinate system having a number of axes corresponding to the number of dimensions.

An access rule can be defined which corresponds to a path through successive pixels along the first axis of the image coordinate system as well as to a path through successive pixels along the second axis of the image coordinate system. There can also be defined two different access rules, one for each axis of the image coordinate system.

Then, on the basis of the access information received, the interface device is able to select an access rule from among the plurality of access rules. The storage method associated with the pixels of the image or images to be processed is indicated in the access information received, so as to allow the device to apply an access rule for this storage method. The storage method corresponds to the method used to store in the memory the data corresponding to the pixels of the image to be processed.

The interface device also receives information which allows it to determine the current block of pixels to be processed. The interface device receives information indicating a base address in the memory, and information indicating the size of the block of pixels to be taken into consideration for the requested memory access.

This block of pixels can correspond to a block of pixels for which the data is to be processed by the processing device. Such is the case when the interface device receives a request to read from the memory.

This block of pixels can correspond to a block of pixels for which the data is to be stored in the memory, because this data has just been processed by the processing device. Such is the case when the interface device receives a request to write to the memory.

The access information allows the determination of the block of pixels to be processed in the image coordinate system. This block of pixels begins with a reference pixel which corresponds to the base address indicated by the access information, and continues for the size of the block indicated in the access information, along the first and second axes of the image coordinate system.

With these conditions, it is possible to access the successive memory addresses which correspond to the pixels in the block of pixels determined in this manner from the access information, by successively following the pixels along the two axes of the image coordinate system. In other words, the read rule allows translating into the memory addressing system the spatial coordinates of pixels expressed in the image coordinate system.

Such a data management process is flexible and can be adapted to different storage methods without requiring the duplication of interface modules connected to a DMA device in order to find a given block of pixels in memory.

In one embodiment, the access rule is applied by implementing a microprogram that comprises microinstructions for managing the address jumps corresponding to the path from pixel to pixel in the block of pixels.

Such an embodiment of the present invention allows great flexibility, particularly concerning the data storage method as well as the operation of the connecting bus that is used.

An access rule along the first or second axis in the image coordinate system can correspond to a sequence of address jumps, and based on the indicated base address, there can be determined at least part of this sequence of jumps to be applied starting from the base address.

Knowing the sequence of address jumps which corresponds to the successive pixels along one of the axes in the image coordinate system, and having determined the part of this sequence of jumps to be applied starting from the base address indicated in the access information, there can be followed a path through the memory which corresponds to the successive pixels in the determined block of pixels along the axis concerned of the image coordinate system.

Such a data management process can advantageously be applied when the interface device is responsible for retrieving the data from the memory in order to supply it to the processing device, and when the interface device is responsible for receiving the data processed by the interface device and storing it in the memory.

In some embodiments, the memory access rule is a rule for reading data. In such cases, the data stored at the addresses can be read in the accessing step, and the data read can be provided to the processor after the accessing step.

In some embodiments, the memory access rule is a rule for writing data. In such cases, data to be written to the memory is received at the interface device in the receiving step, and the received data is stored in the memory in the accessing step at the accessed addresses.

In one embodiment of the present invention, there is selected in the selecting step a first access rule corresponds to a path through successive pixels along the first axis of the image coordinate system, and a second access rule corresponds to a path through successive pixels along the second axis. In this embodiment, in the accessing step, there is applied to the block of pixels the first access rule for the block of pixels of the indicated size, starting from the base address, along the first axis of the image coordinate system. A next address is obtained by applying the second access rule for two consecutive pixels along the second axis of the image coordinate system, starting from the base address. There is applied the first access rule for the block of pixels of the indicated size, along the first axis of the image coordinate system, starting from the next address. A next address along the second axis of the image coordinate system is obtained by applying the second access rule starting from the last next address obtained. There is repeated the applying of the first access rule to the block of pixels of the size indicated, starting from the next address obtained by the obtaining of a next address along the second axis and repeating the obtaining of a next address along the second axis.

Through these arrangements, the interface device is able to find the memory addresses corresponding to the succession of pixels along the two axes of the image coordinate system in an efficient manner. In this embodiment, the block of pixels to be processed is accessed along a first axis, for example a horizontal axis, by applying the first access rule, then when the end of the block of pixels is reached for this axis (meaning in this example when the end of a row is reached), the second access rule is applied to determine the memory address which corresponds to the first pixel in the next row in the block of pixels. Such a use of two access rules for the two axes of the image coordinate system is very efficient.

Preferably, the access rule's sequence of jumps along an axis of the image coordinate system is of a size which allows accessing the maximum size of the given block of pixels along the axis of the image coordinate system.

In one embodiment of the present invention, the access rules are stored in a memory associated with the interface device, and the selection of an access rule corresponds to an address jump, where the selected access rule is stored in the associated memory.

Through these arrangements, an interface device intended to cooperate with a DMA component is able to adapt easily to changes in the memory storage formats.

A second embodiment of the present invention provides an interface device for in an image processing system that also includes a memory and a processing device. The memory is adapted to store, at given addresses, data associated with pixels of images, with the pixels having spatial coordinates in an image coordinate system having a first axis and a second axis The processing device comprises a processor adapted to process the data associated with pixels of images. The interface device includes a receiving unit, a selection unit, and a memory access management unit. The receiving unit is adapted to receive access information for a given block of pixels. The access information indicates a base address in the memory, information regarding the dimensions of the block of pixels along the first and second axes of the image coordinate system, and a storage method. The selection unit is adapted to select, as a function of the indicated storage method, at least one access rule from among multiple distinct access rules, with each of the access rules corresponding to a path through successive pixels along the first and second axes of the image coordinate system according to one storage method from among multiple storage methods. The memory access management unit is adapted to access the memory at the addresses associated with the pixels in the block of pixels, by applying the selected access rule starting from the base address and by taking into account the dimensions of the block of pixels.

A third embodiment of the present invention provides a data processing system that includes such a processing device.

A fourth embodiment of the present invention provides a tangible computer-readable medium encoded with a computer program for an interface device that is part of an image processing system. The computer program comprises instructions for, when the program is executed by the interface device, performing such a data management process.

Exemplary embodiments of the present invention will now be described in detail with reference to FIGS. 1-8.

Figure 1:
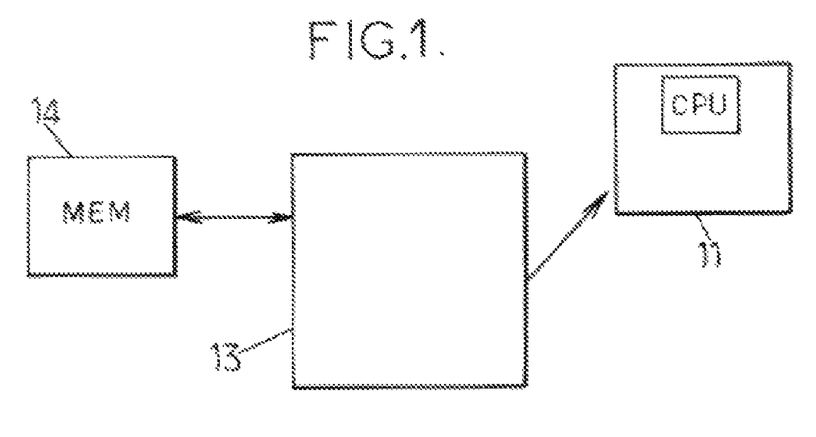
FIG. 1 illustrates the architecture of a data management system according to an embodiment of the present invention.

FIG. 1 illustrates the architecture of a data management system in an embodiment of the present invention. Such a system comprises a memory 14 in which is stored, using one or even multiple storage methods, data corresponding to pixels of images to be processed. The system also comprises a processing device 11 in which a CPU (Central Processing Unit) processes the data stored in the memory based on a successive order of pixels in the image coordinate system.

Such a system additionally comprises an interface device 13 which is in charge of communicating with the memory 14 and with the processing device 11, either directly or via one or more other intermediate devices.

A process according to an embodiment of the present invention allows either retrieving data from memory, for example when the interface device receives a read command, or writing data to memory, for example when the interface device receives a write command.

In the context of reading from memory, the interface device retrieves from memory the data to be processed in order to provide them to the processing device; in the context of writing to memory, the processed data are provided by the processing device in order to be stored in memory.

In one embodiment of the present invention, for any type of command to be implemented in the interface device, the device is adapted to determine the memory addresses of the data corresponding to the pixels in the image coordinate system of the block of pixels to be processed.

For illustrative purposes, the process is detailed below as it applies to reading data. However, the same principles can easily and directly be applied to the process for writing data.

Figure 2:
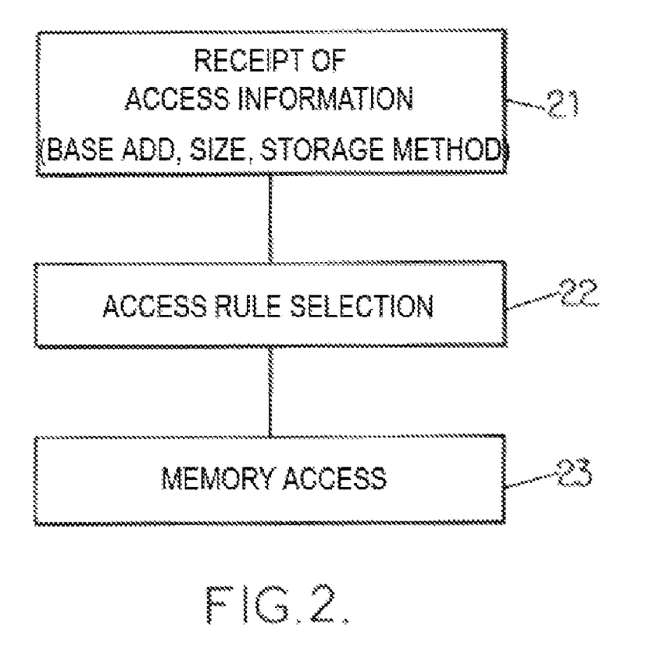
FIG. 2 illustrates a process according to an embodiment of the present invention.

FIG. 2 illustrates the process according to an embodiment of the present invention.

In a step 21, the interface device 13 receives access information. In particular, this access information indicates a base address in the memory, the size of the block of pixels to be processed (meaning the size of the block of pixels for which data is to be read), as well as the storage method used to store the data to be read from memory.

The present invention is not limited with respect to how this access information is indicated.

The size of the block of pixels to be processed can therefore be indicated in various forms, with no limitation regarding this form. In particular, the size can be indicated by specifying the number of rows that comprise the block of pixels to be processed as well as the number of pixels per row, or the number of columns that comprise the block of pixels as well as the number of pixels per column. Or this access information can indicate the total number of pixels in the block of pixels to be processed as well as the number of pixels per row, or the information can indicate the total number of pixels in the block as well as the number of pixels per column.

The interface device can also know beforehand the number of pixels per row in a block of pixels to be processed. In such a case, the access information received by the interface device can indicate only the total number of pixels comprised in the block of pixels to be retrieved. The interface device can know the number of pixels per row in a block of pixels to be processed because such information is stored beforehand in a memory accessible from the interface device. Such information regarding the number of pixels per row can also be deduced from the storage method, which is also indicated by the access information received. In fact, based on the storage method, it is possible to deduce the size of the blocks of pixels to be processed along one dimension in the image coordinate system.

In addition, the base address indicated in the access information can be indicated directly in the form of a memory address or in the form of spatial coordinates in the image coordinate system.

If it is indicated as spatial coordinates in the image coordinate system, these are the spatial coordinates of a reference pixel corresponding to the data stored in the memory at the base address. These spatial coordinates are provided to the interface device, which is then able to translate them into a memory address.

The base address corresponds to the reference pixel, which is the starting point from which the block of pixels to be processed is defined. From the reference pixel and from the size of the block of pixels as indicated in the access information, there can be defined a block of pixels which corresponds to the block of pixels to be processed.

The storage method indicated in the access information can also be indicated in any form.

Figure 3:
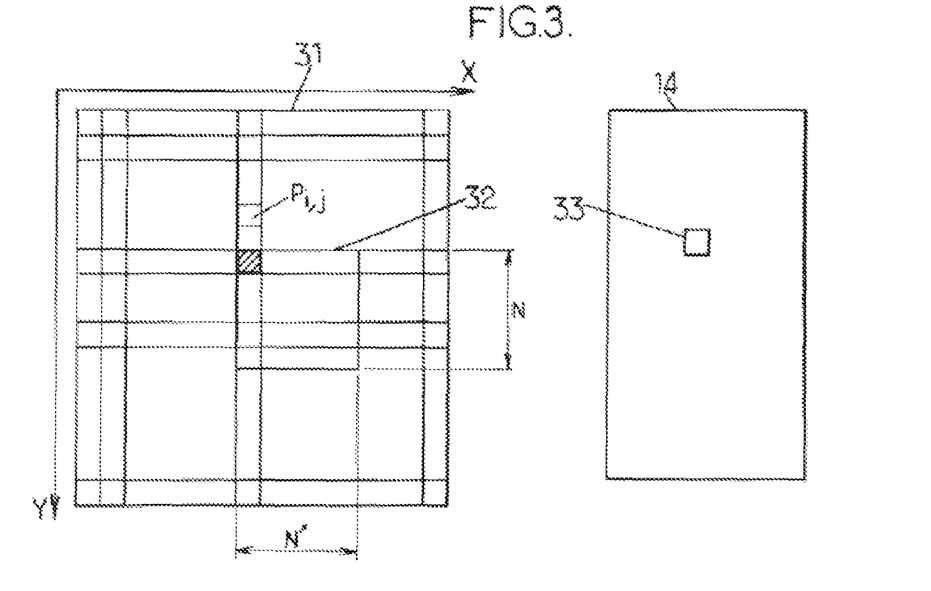
FIG. 3 illustrates a given block of pixels in an image coordinate system according to an embodiment of the present invention.

FIG. 3 illustrates such a step, in accordance with an embodiment of the present invention, of determining the block of pixels to be processed, from the reference pixel and from the size of the block of pixels as indicated in the access information.

In this illustration, a block of pixels to be processed comprises multiple pixel rows and multiple pixel columns. No limitation is placed on the present invention concerning the size of such a block of pixels. Such a block of pixels can correspond to a single row of pixels comprising any number K of pixels, or a single column of pixels comprising any number K' of pixels.

The image coordinate system is represented by a first axis X running horizontally from left to right and a second axis Y running vertically from top to the bottom. In this image coordinate system which is illustrated as an example, each pixel $P_{i,j}$ in a set of pixels 31 associated with an image has a coordinate i in the X direction, and a coordinate j in the Y direction.

A pixel $P_{ref}$ corresponds to the reference pixel that is used to determine the block of pixels to be processed. In the example illustrated in FIG. 3, the size of the block of pixels to be processed is indicated in the access information by the number N' of pixels per row and the number N of pixels per column.

Upon receipt of the access information at the interface device, it is thus possible to identify the pixels to which the data to be retrieved corresponds. This data correspond to the pixels comprised in the block of pixels 32.

FIG. 3 also illustrates the memory 14 comprising a storage area 33 at the base address, which corresponds to the area in which the data representing the reference pixel $P_{ref}$ is stored or will be stored.

Referring back to FIG. 2, an access rule is then selected in a step 22, on the basis of the storage method indicated in the access information received.

The interface device 13 has access to multiple access rules which each correspond to a given storage method. The larger the number of access rules accessible by the interface device, the more adaptable and flexible this device. In one embodiment of the present invention, a memory is associated with the interface device 13 for this purpose. This associated memory stores different access rules. For each storage method indicated, the interface device accesses an area in this memory where the corresponding access rule is stored.

In one embodiment of the present invention, an access rule corresponds to a sequence of jumps.

Figure 4:
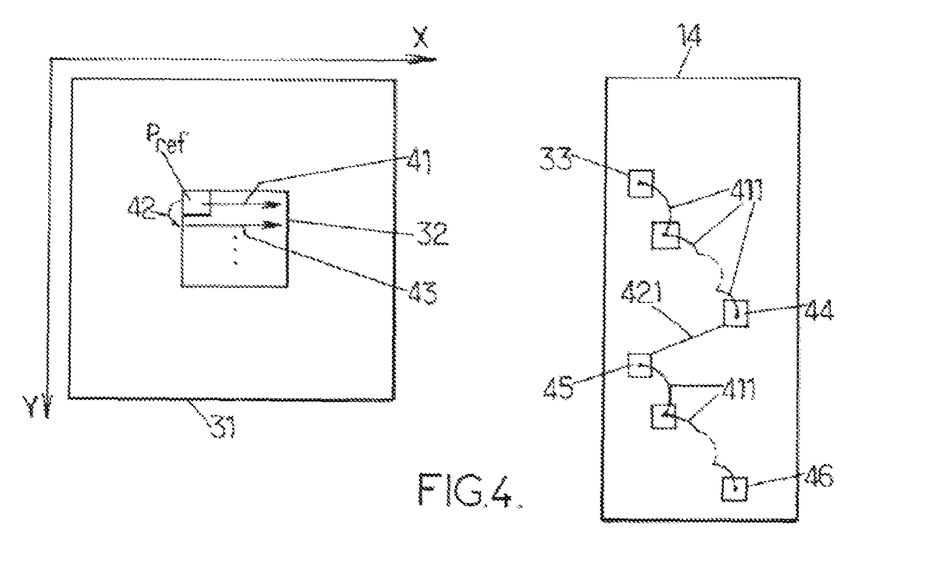
FIG. 4 illustrates the application of an access rule in an embodiment of the present invention.

FIG. 4 illustrates the application of an access rule in an embodiment of the present invention. The set of pixels 31 associated with an image comprises the determined block of pixels to which the process according to an embodiment of the present invention is applied. This block of pixels 32 comprises a reference pixel $P_{ref}$, for which the data is stored at the base address 33 in the memory 14.

Here the access rule is first applied for the X axis of the image coordinate system. For this purpose, the part of the sequence of jumps defined by the access rule that is to be applied is first determined, starting from the base address. The successive pixels are first visited along the X axis of the image coordinate system. The direction of this path is illustrated by an arrow 41 above the first row of pixels in the block of pixels 32. This path 41 in the image coordinate system corresponds to an access rule along the X axis which is illustrated by the memory address jumps 411.

This part of the sequence of jumps is then applied in the memory, starting from the base address indicated in the access information, for the size of the block of pixels along the X axis as determined by the access information. This part of the memory jumps is illustrated by the jumps 411 in the memory 14. The pixel located at the end of the first row of the block of pixels corresponds to the memory address 44 in the memory 14.

In order to apply the access rule for the X axis to the second row of the determined block of pixels, as illustrated by the arrow 43, the memory address of the first pixel of this second row needs to be determined. For this purpose, the access rule for the Y axis is applied, starting at the reference pixel $P_{ref}$.

The part of the sequence of jumps that is to be applied along the Y axis starting from the reference pixel is determined beforehand as a function of the base address, as described above for the application of the access rule for the X axis.

The first jump indicated in this part of the sequence of jumps is then applied, as illustrated by the jump 421 from address 44 to address 45 in the memory 14.

Starting at this address 45, the same sequence of jumps from the access rule for the X axis as determined above is applied, which corresponds to the jumps 411. At the end of this part of the sequence of jumps, the address 46 is reached in the memory 14.

By repeating the above steps, the addresses in the memory 14 which correspond to the successive pixels in the image coordinate system are accessed.

Figure 5:
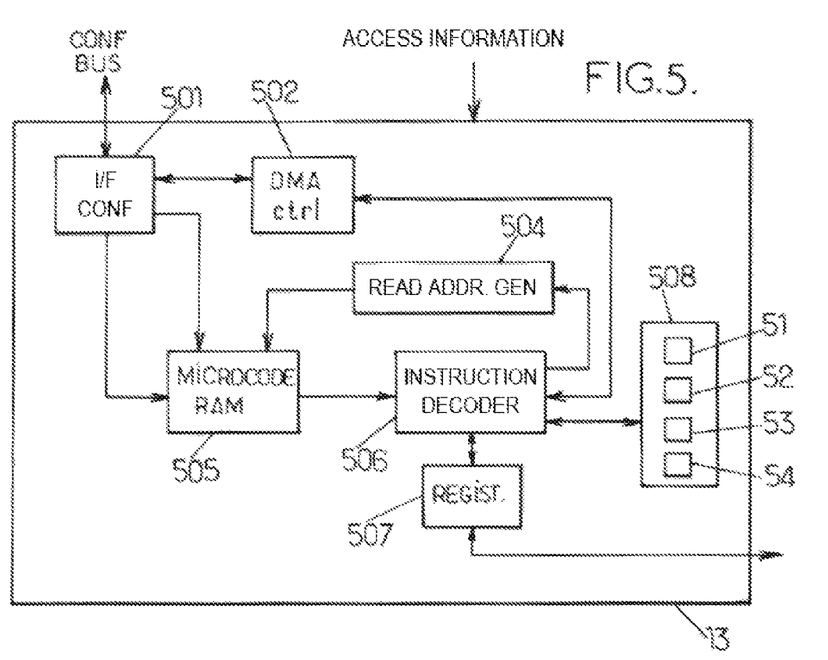
FIG. 5 illustrates the architecture of an interface device in an embodiment of the present invention.

FIG. 5 illustrates the architecture of an interface device in an embodiment of the present invention. Such an interface device comprises a configuration interface 501 that is adapted to receive configuration parameters and to load microcode into RAM (Random Access Memory) 505 via a configuration bus. Such microcode corresponds to the application of access rules managed by the interface device according to an embodiment of the present invention.

This interface device additionally comprises a DMA control module 502 which is responsible for managing the receipt of requests to the DMA device. In particular, this control module prevents accesses to the RAM when a DMA request is being processed.

Such an interface device also comprises an instruction decoder 506 which is responsible for interpreting the instructions provided by the RAM for configuring the buses and control signals of the interface device to specific values.

The interface device also comprises a read address generator 504, or Program Counter, which is responsible for generating the next microinstruction in the microcode which will be read from the RAM.

The interface device also contains a register module 507, which contains a number of registers which can be used by the microcode for either a specific use or a general use.

The interface device also comprises a traffic interface module 508 which is responsible for managing the interface with a signal formatting module, generating useful signals for controlling bus arbitration and generating control signals on the interface device.

For this purpose, the traffic interface module 508 manages a pixel counter per row 51, a row counter 52, a first status register 53 in which is stored the value of the memory address of the first pixel in the current row of pixels, and a second status register 54 in which is stored the value of the base address for the current memory access.

In one embodiment of the present invention, an access rule corresponds to a sequence of memory address jumps. This sequence of jumps can advantageously be implemented by microcode which calls microinstructions as defined below.

It is possible to have a library of microinstructions which are called from the different microcodes corresponding to the different access rules an interface device is able to manage and apply.

Figure 6:
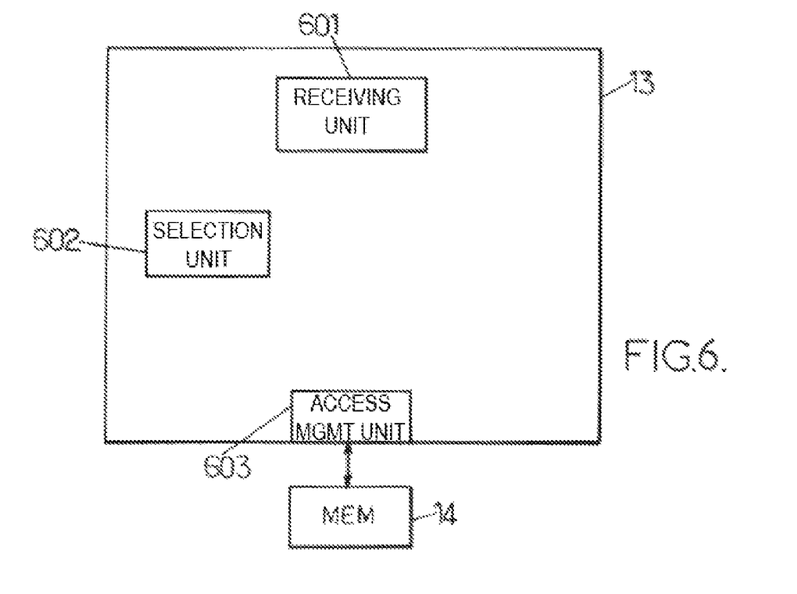
FIG. 6 illustrates an interface device in an embodiment of the present invention.

FIG. 6 illustrates an interface device in an embodiment of the present invention. This interface device comprises a receiving unit 601 that is adapted to receive access information indicating a base address in the memory, information representing the size of the determined block of pixels along the first and second axes of the image coordinate system, and a storage method.

The interface device additionally comprises a selection unit 602 that is adapted to select, as a function of the indicated storage method, at least one access rule from among multiple access rules, with each of the access rules corresponding to a path through successive pixels along the first and second axes of the image coordinate system according to a determined storage method.

The interface device also comprises a memory access management unit 603 that is adapted to access the memory addresses corresponding to the pixels of the block of pixels, by applying the selected access rule starting from the indicated base address and by taking into account the indicated size of the block of pixels.

The access management unit 603 applies an access rule by executing a microprogram, with the microprogram comprising microcommands for managing the memory address jumps which correspond to the path through the pixels in the determined block of pixels in the image coordinate system.

The access management unit 603 applies an access rule for an axis of the image coordinate system which corresponds to a sequence of address jumps in the memory, and, as a function of the indicated base address, determines the part of this sequence of jumps to apply starting from the base address.

Figure 7:
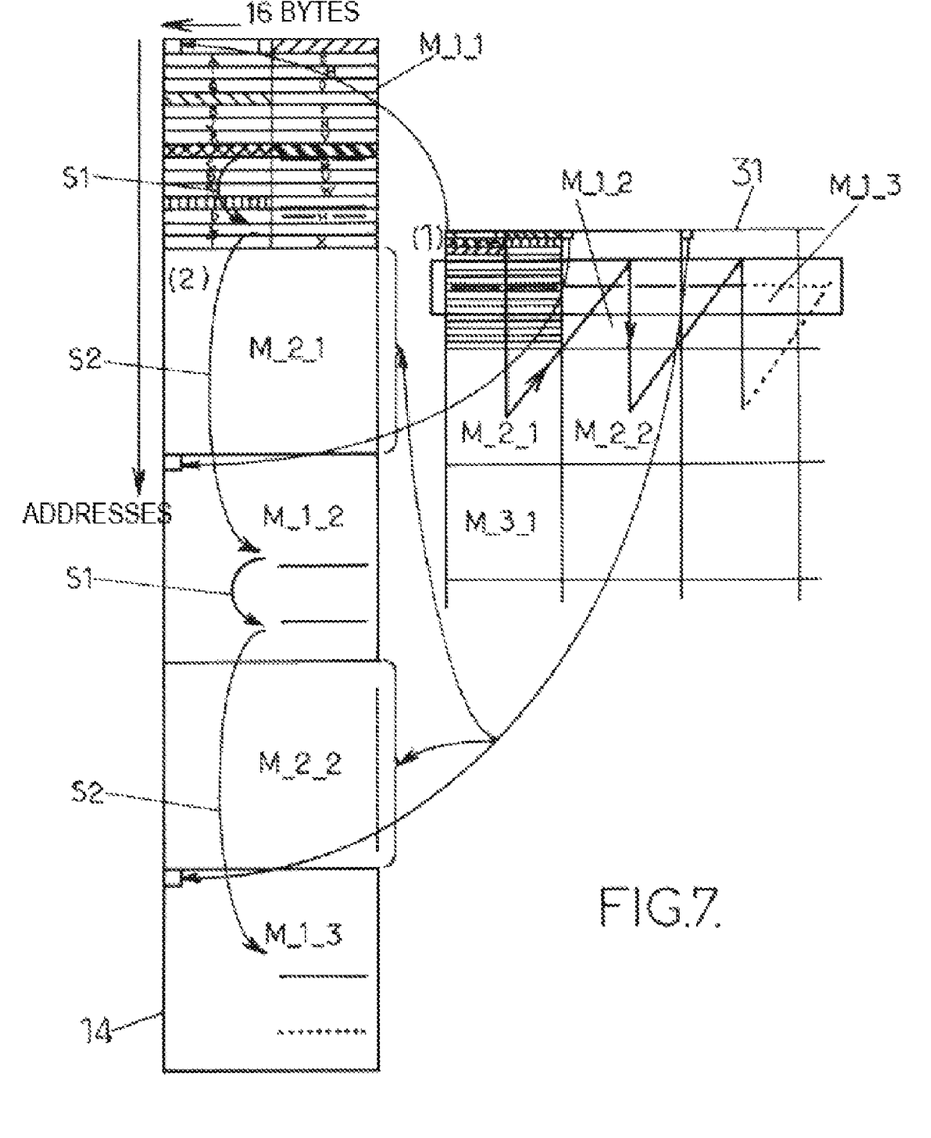
FIGS. 7 and 8 illustrate the application of a process according to an embodiment of the present invention for a particular storage method known as "Macroblock Luma".

FIG. 7 illustrates an arrangement in the memory 14 of data representing the pixels of an image stored using a particular method which is known as "Macroblock Luma". This data corresponds to pixels which are illustrated in the image coordinate system 31. The organization of pixels using such a storage method is based on a management of 2-byte by 2-byte macroblocks: macroblocks M_i_1, M_i_2, M_i_Y in the image coordinate system along the horizontal axis, where i is between 1 and X, with the image having a number X of rows and a number Y of columns, and macroblocks M_1_j, M_2_j and M_X_j, where j is between 1 and Y along the vertical axis of the image coordinate system.

The macroblocks are stored in the memory 14 as illustrated, meaning that the macroblocks M_1_1, M_2_1, M_1_2, M_2_2, and so on successively follow each other.

In such a context, a path through a row of pixels in the image coordinate system corresponds to a succession of jumps in memory 14, which corresponds to the repetition of a series of successive jumps S1 and S2.

Figure 8:
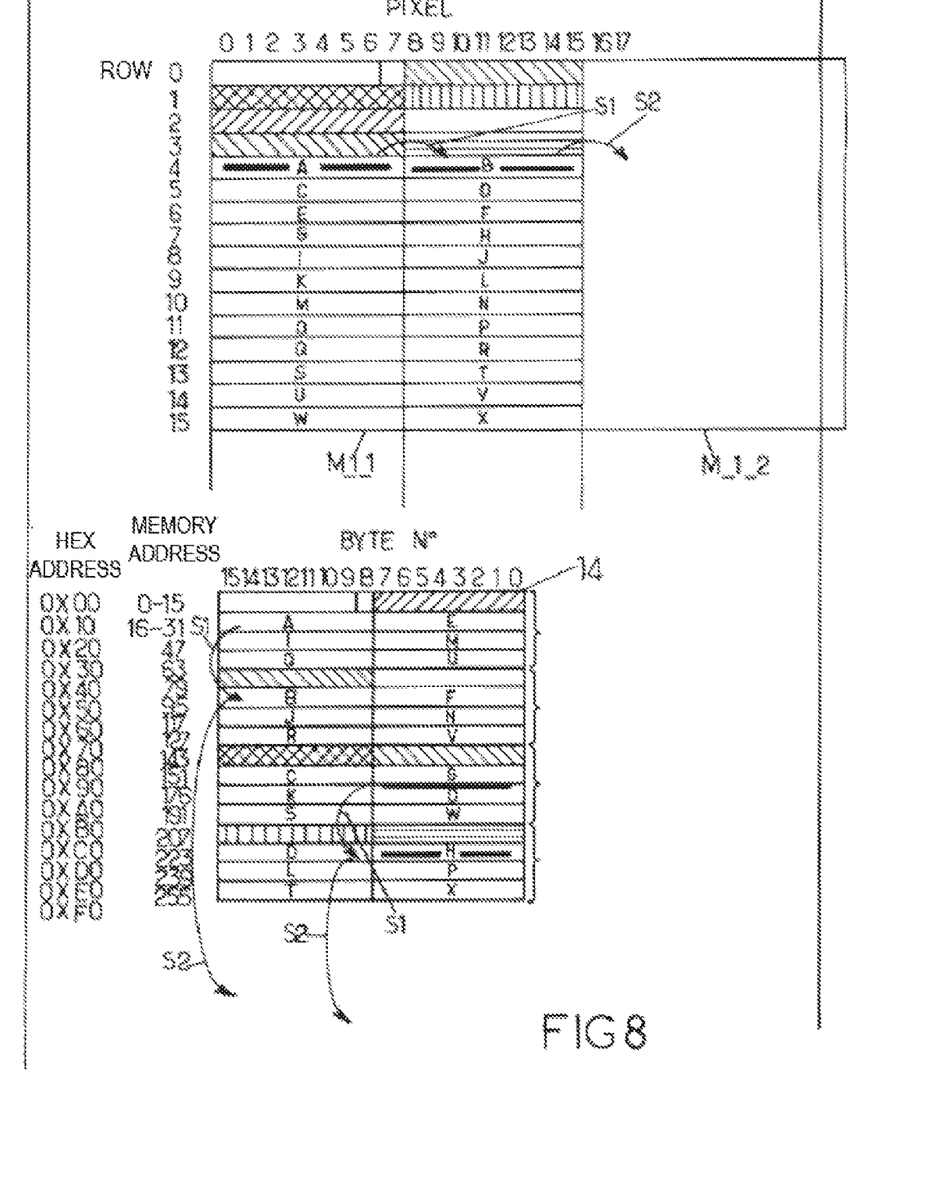

FIG. 8 provides a detailed illustration of such a path through the memory. For example, to travel across the row of index 4 in the macroblock M_1_1 which comprises a first byte A and a second byte B, one advances from byte A to byte B in the memory 14 by a jump S1. This jump S1 between successive bytes in the same row of a macroblock of the image in question corresponds to a jump of four rows in the memory 14.

Then, to advance from byte B to the next byte in macroblock M_1_2, placed in the same row as the byte B in the image coordinate system, a jump S2 is defined for the corresponding jump in the memory 14. This jump S2 corresponds to a jump of 32 rows.

By successively applying the jumps S1 followed by S2, the data representing the successive pixels in a row of the image coordinate system are visited in the memory.

In such a context, it is possible to determine, as a function of the base address, which of the two jumps S1 and S2 is to be applied first.

Here the addresses (in hex) in the memory 14 which are between 0x00 and 0x3F correspond to the data representing the pixels in every other row (starting with the first row) of the first part of the macro-block M_1_1, which corresponds to the rows with indices of 0 to 7. The addresses in the memory 14 between 0x80 and 0xBF correspond to the data representing the pixels in every other row (starting with the second row) of the first part of the macro-block M_1_1, which corresponds to the rows with indices of 0 to 7.

The addresses (in hex) in the memory 14 which are between 0x40 and 0x7F correspond to the data representing the pixels in every other row (starting with the first row) of the second part of the macro-block M_1_1, which corresponds to the rows with indices of 8 to 15. The addresses in the memory 14 between 0xC0 and 0xFF correspond to the data representing the pixels in every other row (starting with the second row) of the second part of the macro-block M_1_1, which corresponds to the rows with indices of 8 to 15.

Under such conditions, it is easy to define the jump to be applied from among the jumps in the sequence of jumps, as a function of the base address, by considering bit 6 of the base address.

If bit 6 of the base address is equal to 0, the first jump to be applied is the jump S1, and if bit 6 of the base address is equal to 1, the first jump to be applied is the jump S2.

Thus, starting at the base address, in order to determine the jump to be applied from the sequence of jumps corresponding to the selected access rule, there can advantageously be applied the mask 0x40 to this base address, and depending on the result there is applied either S1 or S2, then successively S2, S1, and so on, or S2, S1, and so on, respectively.

In one embodiment of the present invention, the access management unit 603 is responsible for determining the part of the sequence of jumps to be applied starting from the base address, on the basis of a comparison of the base address to a determined value.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A data management method for an image processing system that includes a memory, a processing device, and an interface device, the memory being adapted for storing, at determined addresses, data associated with pixels of images, the pixels having spatial coordinates in an image coordinate system having a first axis and a second axis, the processing device comprising a processor adapted to process the data associated with pixels of images, and the interface device being adapted to access, in the memory, addresses associated with blocks of pixels of different sizes and stored with different storage methods, the data management method comprising the steps, executed by the interface device, of:

receiving, at the interface device, first access information for a first determined block of pixels, the first access information including a first base address in the memory, a first dimension of the first determined block of pixels along the first axis, a second dimension of the first determined block of pixels along the second axis, and a first storage method used to store the data associated with the first determined block of pixels in the memory;

as a function of the first storage method, selecting a first access rule, which corresponds to a path through successive pixels along the first axis of the image coordinate system, and selecting a second access rule, which corresponds to a path through successive pixels along the second axis, from among a plurality of distinct access rules, each of the access rules corresponding to a path through successive pixels along the first and/or second axes of the image coordinate system according to one storage method from among a plurality of storage methods;

accessing in the memory the addresses associated with the pixels in the first determined block of pixels, by applying the selected first and second access rules starting from the first base address and based on the first and second dimensions of the first determined block of pixels along the first and second axes, so as to access all of the addresses associated with the pixels in the first determined block of pixels stored using the first storage method;

receiving, at the interface device, second access information for a second determined block of pixels, the second access information including a second base address in the memory, a third dimension of the second determined block of pixels along the first axis, a fourth dimension of the second determined block of pixels along the second axis, and a second storage method used to store the data associated with the second determined block of pixels in the memory;

as a function of the second storage method, selecting a third access rule, which corresponds to a path through successive pixels along the first axis of the image coordinate system, and selecting a fourth access rule, which corresponds to a path through successive pixels along the second axis, from among the plurality of distinct access rules; and accessing in the memory the addresses associated with the pixels in the second determined block of pixels, by applying the selected third and fourth access rules starting from the second base address and based on the third and fourth dimensions of the second determined block of pixels along the first and second axes, so as to access all of the addresses associated with the pixels in the second determined block of pixels stored using the second storage method, wherein the first storage method is different than the second storage method, at least one of the first dimension is different than the third dimension and the second dimension is different than the fourth dimension, and at least one of the first access rule is different than the third access rule and the second access rule is different than the fourth access rule.

2. The data management method according to claim 1, wherein the accessing step comprises applying the selected access rules by executing a microprogram comprising microinstructions for managing memory address jumps that correspond to the paths through successive pixels along the first and second axes.

3. The data management method according to claim 1, wherein at least one of the first and second access rules corresponds to a sequence of memory address jumps, and at least a part of this sequence of memory address jumps is determined as a function of the base address.

4. The data management method according claim 1, wherein the first access rule is a rule for reading data, and the data stored at the determined addresses is read in the accessing step and the read data is provided to the processor after the accessing step.

5. The data management method according claim 1, wherein the first access rule is a rule for writing data, and data to be written to memory is received at the interface device in the receiving step, and the received data is stored in the memory at the accessed addresses in the accessing step.

6. The data management method according to claim 1, wherein the first access rule comprises successively applying a first address jump and a second address jump so as to successively access the addresses associated with the successive pixels along the first axis of the image coordinate system, the first address jump being different than the second address jump, and the step of accessing in the memory the addresses associated with the pixels in the first determined block of pixels comprises determining, as a function of the first base address that is received at the interface device, which of the first and second address jumps to apply to the base address.

7. The data management method according to claim 1, wherein the first access rule comprises a repetition of a series of at least two address jumps so as to successively access the addresses associated with the successive pixels along the first axis of the image coordinate system, and the at least two address jumps include a first address jump and a second address jump, which is different than the first address jump.

8. The data management method according to claim 7, wherein the step of accessing in the memory the addresses associated with the pixels in the first determined block of pixels comprises determining, as a function of the first base address that is received at the interface device, which of the first and second address jumps to apply first in the series.

9. The data management method according to claim 7, wherein the step of accessing in the memory the addresses associated with the pixels in the first determined block of pixels comprises determining which of the first and second address jumps to apply to the first base address by comparing the first base address to a determined value.

10. The data management method according to claim 1, wherein the step of accessing in the memory the addresses associated with the pixels in the first determined block of pixels comprises:

applying, along the first axis of the image coordinate system, the first access rule starting from the first base address for the first dimension of the first determined block of pixels along the first axis;

obtaining a next address along the second axis of the image coordinate system by applying the second access rule to the first base address;

applying, along the first axis of the image coordinate system, the first access rule starting from the next address for the first dimension of the first determined block of pixels along the first axis;

obtaining another next address along the second axis of the image coordinate system by applying the second access rule to the last next address obtained; and repeating, based on the second dimension of the first determined block of pixels along the second axis, the applying of the first access rule starting from the next address and the obtaining of another next address along the second axis, so as to access all of the addresses associated with the pixels in the first determined block of pixels stored using the first storage method.

11. The data management method according to claim 10, wherein the step of accessing in the memory the addresses associated with the pixels in the second determined block of pixels comprises:

applying, along the first axis of the image coordinate system, the third access rule starting from the second base address for the third dimension of the second determined block of pixels along the first axis;

obtaining a next address along the second axis of the image coordinate system by applying the fourth access rule to the second base address;

applying, along the first axis of the image coordinate system, the third access rule starting from the next address for the third dimension of the second determined block of pixels along the first axis;

obtaining another next address along the second axis of the image coordinate system by applying the fourth access rule to the last next address obtained; and repeating, based on the fourth dimension of the second determined block of pixels along the second axis, the applying of the third access rule starting from the next address and the obtaining of another next address along the second axis, so as to access all of the addresses associated with the pixels in the second determined block of pixels stored using the second storage method.

12. An interface device for an image processing system that includes a memory and a processing device, the memory being adapted to store, at determined addresses, data associated with pixels of images, the pixels having spatial coordinates in an image coordinate system having a first axis and second axis, the processing device comprising a processor adapted to process the data associated with pixels of images, and the interface device being adapted to access, in the memory, addresses associated with blocks of pixels of different sizes and stored with different storage methods, the interface device comprising:
 a receiving unit adapted to receive first access information for a first determined block of pixels, the first access information including a first base address in the memory, a first dimension of the first determined block of pixels along the first axis, a second dimension of the first determined block of pixels along the second axis, and a first storage method used to store the data associated with the first determined block of pixels in the memory;
 a selection unit adapted to select, as a function of the first storage method, a first access rule, which corresponds to a path through successive pixels along the first axis of the image coordinate system, and a second access rule, which corresponds to a path through successive pixels along the second axis, from among a plurality of distinct access rules, each of the access rules corresponding to a path through successive pixels along the first and/or second axes of the image coordinate system according to one storage method from among a plurality of storage methods; and
 a memory access management unit adapted to access in the memory the addresses associated with the pixels of the first determined block of pixels, by applying the selected first and second access rules starting from the first base address and based on the first and second dimensions of the first determined block of pixels along the first and second axes, so as to access all of the addresses associated with the pixels in the first determined block of pixels stored using the first storage method,
 wherein the receiving unit is further adapted to receive second access information for a second determined block of pixels, the second access information including a second base address in the memory, a third dimension of the second determined block of pixels along the first axis, a fourth dimension of the second determined block of pixels along the second axis, and a second storage method used to store the data associated with the second determined block of pixels in the memory,
 the selection unit is further adapted to select as a function of the second storage method, a third access rule, which corresponds to a path through successive pixels along the first axis of the image coordinate system, and a fourth access rule, which corresponds to a path through successive pixels along the second axis, from among the plurality of distinct access rules,
 the memory access management unit is further adapted to access in the memory the addresses associated with the pixels in the second determined block of pixels, by applying the selected third and fourth access rules starting from the second base address and based on the third and fourth dimensions of the second determined block of pixels along the first and second axes, so as to access all of the addresses associated with the pixels in the second determined block of pixels stored using the second storage method,
 the first storage method is different than the second storage method,
 at least one of the first dimension is different than the third dimension and the second dimension is different than the fourth dimension, and
 at least one of the first access rule is different than the third access rule and the second access rule is different than the fourth access rule.

13. The interface device according to claim 12, wherein the memory access management unit is adapted to apply the selected access rules by executing a microprogram comprising microinstructions that manage address jumps in memory that correspond to the paths through successive pixels along the first and second axes.

14. The interface device according to claim 12, wherein the memory access management unit applies at least one of the first and second access rules which corresponds to a sequence of memory address jumps, and determines, as a function of the base address, at least a part of this sequence of memory address jumps.

15. The interface device according to claim 12, wherein the memory access management unit is adapted to apply the first access rule that corresponds to a rule for reading data, and supplies the read data to the processor.

16. The interface device according to claim 12, wherein the memory access management unit is adapted to apply the first access rule that corresponds to a rule for writing data, and stores in the memory the data received from the processor.

17. An image processing system comprising the interface device according to claim 12.

18. A non-transitory computer-readable medium encoded with a computer program for an interface device, the interface device being part of an image processing system that also includes a memory and a processing device, the memory being adapted for storing, at determined addresses, data associated with pixels of images, the pixels having spatial coordinates in an image coordinate system having a first axis and a second axis, the processing device comprising a processor adapted to process the data associated with pixels of images, and the interface device being adapted to access, in the memory, addresses associated with blocks of pixels of different sizes and stored with different storage methods, the computer program comprising instructions for, when the program is executed by the interface device, performing the steps of:
 receiving, at the interface device, first access information for a first determined block of pixels, the first access information including a first base address in the memory, a first dimension of the first determined block of pixels along the first axis, a second dimension of the first determined block of pixels along the second axis, and a first storage method used to store the data associated with the first determined block of pixels in the memory;
 as a function of the first storage method, selecting a first access rule, which corresponds to a path through successive pixels along the first axis of the image coordinate system, and selecting a second access rule, which corresponds to a path through successive pixels along the second axis, from among a plurality of distinct access rules, each of the access rules corresponding to a path through successive pixels along the first and/or second axes of the image coordinate system according to one storage method from among a plurality of storage methods;

accessing in the memory the addresses associated with the pixels in the first determined block of pixels, by applying the selected first and second access rules starting from the first base address and based on the first and second dimensions of the first determined block of pixels along the first and second axes, so as to access all of the addresses associated with the pixels in the first determined block of pixels stored using the first storage method;

receiving, at the interface device, second access information for a second determined block of pixels, the second access information including a second base address in the memory, a third dimension of the second determined block of pixels along the first axis, a fourth dimension of the second determined block of pixels along the second axis, and a second storage method used to store the data associated with the second determined block of pixels in the memory;

as a function of the second storage method, selecting a third access rule, which corresponds to a path through successive pixels along the first axis of the image coordinate system, and selecting a fourth access rule, which corresponds to a path through successive pixels along the second axis, from among the plurality of distinct access rules; and accessing in the memory the addresses associated with the pixels in the second determined block of pixels, by applying the selected third and fourth access rules starting from the second base address and based on the third and fourth dimensions of the second determined block of pixels along the first and second axes, so as to access all of the addresses associated with the pixels in the second determined block of pixels stored using the second storage method, wherein the first storage method is different than the second storage method, at least one of the first dimension is different than the third dimension and the second dimension is different than the fourth dimension, and at least one of the first access rule is different than the third access rule and the second access rule is different than the fourth access rule.

19. The non-transitory computer-readable medium according to claim 18, wherein the accessing step comprises applying the selected access rules by executing a microprogram comprising microinstructions for managing memory address jumps that correspond to the paths through successive pixels along the first and second axes.

20. The non-transitory computer-readable medium according to claim 18, wherein at least one of the first and second access rules corresponds to a sequence of memory address jumps, and at least a part of this sequence of memory address jumps is determined as a function of the base address.

* * * * *